United States Patent
Bauer et al.

(10) Patent No.: US 6,743,766 B1
(45) Date of Patent: Jun. 1, 2004

(54) SPARINGLY SOLUBLE ALKALI METAL SILICATE

(75) Inventors: Harald Bauer, Kerpen (DE); Josef Holz, Erftstadt (DE); Guenther Schimmel, Erftstadt (DE); Alexander Tapper, Moenchengladbach (DE)

(73) Assignee: Clariant GmbH, Frankfurt (DE)

( * ) Notice: Subject to any disclaimer, the term of this patent is extended or adjusted under 35 U.S.C. 154(b) by 246 days.

(21) Appl. No.: 09/659,394

(22) Filed: Sep. 11, 2000

(30) Foreign Application Priority Data

Sep. 11, 1999 (DE) .......................... 199 43 551

(51) Int. Cl.$^7$ .............................. C11D 3/08; C11D 7/14
(52) U.S. Cl. ...................... 510/466; 510/220; 510/221; 510/222; 510/228; 510/232; 510/507; 510/511; 510/532; 423/332; 423/327.1; 423/328.2
(58) Field of Search ................... 510/220, 221, 510/222, 228, 232, 466, 507, 511, 532; 423/332, 327.1, 328.2

(56) References Cited

U.S. PATENT DOCUMENTS

| | | | |
|---|---|---|---|
| 4,664,839 A | 5/1987 | Rieck | 252/175 |
| 4,820,439 A | 4/1989 | Rieck | 252/135 |
| 5,183,651 A | 2/1993 | Schimmel et al. | 423/334 |
| 5,236,682 A | 8/1993 | Schimmel et al. | 423/334 |
| 5,308,596 A | 5/1994 | Kotzian et al. | 423/333 |
| 5,614,160 A | 3/1997 | Gill et al. | 423/332 |
| 5,900,399 A * | 5/1999 | Seiter et al. | 510/446 |
| 6,099,595 A | 8/2000 | Holz et al. | 423/332 |
| 6,372,709 B1 * | 4/2002 | Bauer et al. | 510/511 |
| 6,407,055 B1 * | 6/2002 | Bauer et al. | 510/511 |
| 6,455,491 B2 * | 9/2002 | Bauer et al. | 510/511 |
| 6,506,722 B1 * | 1/2003 | Bauer et al. | 510/511 |
| 6,539,954 B1 * | 4/2003 | Schimmel et al. | 134/25.3 |

FOREIGN PATENT DOCUMENTS

| | | | |
|---|---|---|---|
| DE | 44 01 527 | 7/1995 | C01B/33/32 |
| DE | 197 07 449 | 4/1998 | C01B/33/32 |
| DE | 199 25 928 | 1/2000 | C01B/33/32 |
| EP | 0 164 514 | 12/1985 | C02F/5/08 |
| EP | 0 425 428 | 5/1991 | C01B/33/32 |
| EP | 0 436 835 | 7/1991 | C01B/33/32 |
| EP | 0 548 599 | 6/1993 | C01B/33/34 |
| EP | 0 550 048 | 7/1993 | B01J/39/08 |
| EP | 0 550 048 | 3/1996 | B01J/39/08 |
| EP | 0 970 918 | 1/2000 | C01B/33/38 |
| WO | WO 96/01307 | 1/1996 | C11D/3/08 |
| WO | WO 00/18859 | 4/2000 | C11D/3/12 |

OTHER PUBLICATIONS

EPO Search Report Dec. 15, 2000.
Derwent Patent Family Abstract for EP 0 970 918 Jan. 12, 2000.
German Search Report May 23, 2000 Not Translated.
Derwent Patent Family Abstract for DE 199 25 928 Jan. 13, 2000.
Derwent Patent Family Abstract for DE 44 01 527 Jul. 27, 1995.

* cited by examiner

*Primary Examiner*—Brian P. Mruk
(74) *Attorney, Agent, or Firm*—Richard P. Silverman

(57) ABSTRACT

The invention relates to a sparingly soluble alkali metal silicate which comprises alkali metal phyllosilicate in finely divided form in a non-phyllosilicatic alkali metal silicate environment of the formula x $M^I_2O \cdot y\ SiO_2$, in which $M^I$ is an alkali metal and y/x (1.9 to 500): 1; a process for its preparation and its use in detergents and cleaners.

33 Claims, No Drawings

SPARINGLY SOLUBLE ALKALI METAL SILICATE

CROSS-REFERENCES TO RELATED APPLICATIONS

The present invention is described in the German priority application No. 19943551.0, filed Sep. 11, 1999, which is hereby incorporated by reference as is fully disclosed herein.

BACKGROUND OF THE INVENTION

The invention relates to a sparingly soluble alkali metal silicate, to a process for its preparation and to its use in detergents and cleaners.

Crystalline sheet sodium silicates (phyllosilicates) of the formula $NaMSi_xO_{2x+1} \cdot yH_2O$, where M is sodium or hydrogen, x is a number from 1.9 to 4 and y is a number from 0 to 20, and preferred values for x are 2, 3 or 4, have proven to be suitable replacements for the detergent builders phosphate and zeolite. The use of such crystalline phyllosilicates for softening water is described, for example, in EP-A-0 164 514.

Detergent builders fulfill a large number of functions. Of these, particular mention may be made of the removal of or reduction in water hardness in the mains water used for washing and the supply of alkalinity, i.e. the regulation of and increase in the pH in the wash liquor.

The removal of the water hardness present in mains water in the form of calcium and magnesium ions is important since, at the customary, in particular relatively high, washing temperatures, it causes inorganic incrustations on heating elements and walls of the washing machine and also on textiles, and causes the anionic surfactants frequently used to precipitate out in the form of so-called lime soaps. This results in a reduction in detergency and leads to a gray haze on the laundry after just a few wash cycles.

The abovementioned inorganic incrustations consist of water hardness precipitated out in the form of calcium carbonate or of deposited residues of dissolved detergent builder components. The desired increase in the pH in the wash liquor results in the soil particles which may be present having a higher surface charge, making them easier to remove from the fabric being washed.

Silicatic detergent builders are divided into readily soluble types and sparingly soluble types. Readily soluble silicatic detergent builders are frequently pure X-ray-amorphous sodium silicates. Although these sodium silicates, which are prepared from spray-dried sodium water glass, are able to contribute to the regulation of the pH, they are only able to make a small contribution to the lowering of the water hardness.

Sparingly soluble detergent builders, which primarily include the aluminum-containing silicates (zeolites), are, however, not able by themselves to favorably influence the pH in the wash solution, i.e. to provide higher alkalinity of the wash solution.

The same is true for the sparingly soluble magnesium-containing silicates, as are known, for example, from EP-A-0 550 048.

SUMMARY OF THE INVENTION

There has therefore hitherto been a lack of builders of the sparingly soluble type which, despite their poor solubility, have a high water-softening capacity and at the same time display convincing effectiveness as builders. The object of the present invention was therefore to provide a sparingly soluble builder based on alkali metal silicate which has both a high water-softening capacity and is itself highly effective as a builder.

DESCRIPTION OF THE PREFERRED EMBODIMENTS

This object is achieved by a sparingly soluble alkali metal silicate of the type mentioned in the introduction, which comprises alkali metal phyllosilicates in finely divided form in a non-phyllosilicatic alkali metal silicate environment of the formula $x\, M^I_2O \cdot y\, SiO_2$, in which $M^I$ is an alkali metal and y/x is (1.9 to 500):1. An essential feature here is that the alkali metal phyllosilicates are embedded into a non-phyllosilicatic matrix.

The crystalline alkali metal silicate preferably corresponds overall to the formula

in which $M^I$ is an alkali metal, $M^{II}$ is an alkaline earth metal, X is an element of the third main group and Z is an element of the fifth main group of the Periodic Table of the Elements and the following also applies:

$0 \leq a \leq 1$;
$0 \leq c/e \leq 0.05$;
$0 \leq d/e \leq 0.25$;
$1.9 \leq e \leq 4$;
$0 \leq f \leq 20$.

Preferably, $0 \leq a \leq 1$;
$0 \leq b \leq 0.05$;
$0 \leq c/e \leq 0.025$;
$0 \leq d/e \leq 0.01$;
$1.9 \leq e \leq 4$;
$0 \leq f \leq 20$.

Particularly preferably, $0 \leq a \leq 1$;
$b=0$;
$c/e=0$;
$d/e=0$;
$19 \leq e \leq 4$;
$0 \leq f \leq 20$.

Preferably, y/x is (2.0 to 200):1.
$M^I$ is preferably sodium.

The non-phyllosilicatic alkali metal silicate environment is preferably composed of non-phyllosilicatic sodium silicate.

Such non-phyllosilicatic sodium silicates include, in particular, the amorphous sodium silicates which, in the X-ray powder diffractogram, typically exhibit no sharp reflections which can be assigned to an ordered crystalline structure; they do not have a defined stoichiometric composition either. The alkali metal phyllosilicate is preferably composed of sheet crystalline disodium disilicates.

The latter in turn usually consist of at least one polymorphous phase.

The sparingly soluble alkali metal silicate preferably consists of 1 to 40% by weight of alpha-disodium disilicate,
0 to 60% by weight of beta-disodium disilicate,
10 to 77% by weight of delta-disodium disilicate and 0,1 to 40% by weight, preferably 1 to 20% by weight, of non-phyllosilicatic sodium silicates.

In another embodiment of the invention, the sparingly soluble alkali metal silicate consists of 0 to 40% by weight of alpha-disodium disilicate,
15 to 98% by weight of beta-disodium disilicate,
0 to 40% by weight of delta-disodium disilicate and
0,1 to 50% by weight, preferably 1 to 35% by weight, of non-phyllosilicatic sodium silicates.

In a further embodiment of the invention, the sparingly soluble alkali metal silicate consists of 16 to 98% by weight of alpha-disodium disilicate,
0 to 40% by weight of beta-disodium disilicate,
0 to 50% by weight of delta-disodium disilicate and
0,1 to 50% by weight, preferably 1 to 35% by weight, of non-phyllosilicatic sodium silicates.

In a further embodiment of the invention, the sparingly soluble alkali metal silicate consists of 21 to 98% by weight of alpha-disodium disilicate,
0 to 40% by weight of beta-disodium disilicate,
0 to 50% by weight of delta-disodium disilicate and
0,1 to 50% by weight, preferably 1 to 35% by weight, of non-phyllosilicatic sodium silicates.

In a further embodiment of the invention, the sparingly soluble alkali metal silicate consists of 1 to 40% by weight of alpha-disodium disilicate,
0 to 50% by weight of beta-disodium disilicate,
10 to 98% by weight of delta-disodium disilicate and
0,1 to 50% by weight, preferably 1 to 35% by weight, of non-phyllosilicatic sodium silicates.

In a further embodiment of the invention, the sparingly soluble alkali metal silicate consists of 0 to 4% by weight of alpha-disodium disilicate,
0 to 4% by weight of beta-disodium disilicate,
96 to 100% by weight, preferably 96 to 99% by weight, of delta-disodium isilicate and
0,1 to 4% by weight, preferably 1 to 4% by weight, of non-phyllosilicatic sodium silicates.

In a further embodiment of the invention, the sparingly soluble alkali metal silicate consists of 0 to 10% by weight of alpha-disodium disilicate,
0 to 10% by weight of beta-disodium disilicate,
91 to 100% by weight, preferably 91 to 99% by weight, of delta-disodium disilicate and
0,1 to 10% by weight, preferably 1 to 9% by weight, of non-phyllosilicatic sodium silicates.

The sparingly soluble alkali metal silicate preferably comprises up to 10% by weight, based on the alkali metal silicate content, of further constituents.

The further constituents are preferably cationic and/or anionic constituents.

The cationic constituents are preferably alkali metal ions and/or alkaline earth metal cations and/or Fe, W, Mo, Ta, Pb, Sn, Al, Zn, Ti, V, Cr, Mn, Co and/or Ni.

The anionic constituents are preferably sulfates, fluorides, chlorides, bromides, iodides, carbonates, hydrogencarbonates, nitrates, oxide hydrates, phosphates and/or borates.

The sparingly soluble alkali metal silicate preferably comprises up to 10 mol% of boron, based on the total content of $SiO_2$.

The sparingly soluble alkali metal silicate preferably comprises up to 50 mol% of phosphorus, based on the total content of $SiO_2$.

The sparingly soluble alkali metal silicate preferably has, as powder, a mean particle diameter of from 0.1 to 150 $\mu$m. The sparingly soluble alkali metal silicate preferably has, as compacted granulate, a mean particle diameter of from 10 to 2000 $\mu$m.

The present object is likewise achieved by a process for the preparation of sparingly soluble alkali metal silicates, which comprises mixing a sodium silicate-containing starting material with one or more compounds which comprise the components $M^I$, $M^{II}$, X and/or Z, and crystallizing the mixture. $M^I$ is an alkali metal, $M^{II}$ is an alkaline earth metal, X is an element of the third main group and Z is an element of the fifth main group of the Periodic Table of the Elements. Suitable compounds are preferably the oxides, although other compounds are also suitable. The mixing ratio of the reactants is preferably chosen such that the mixture has a composition which corresponds to the composition of the above-described alkali metal silicates according to the invention.

The sodium silicate-containing starting material used is preferably water glass.

Preferably, water glass is mixed with sodium hydroxide solution, water glass or other silicate sources, spray-dried and crystallized.

The crystallization temperature is preferably 700 to 1300 K.

The crystallization temperature is preferably 800 to 1200 K.

The crystallization temperature is particularly preferably 900 to 1100 K.

The invention also relates to the use of sparingly soluble alkali metal silicate for the preparation of detergents and cleaners, including dishwashing detergents.

The invention likewise relates to detergents and cleaners which comprise a sparingly soluble alkali metal silicate according to the invention.

The detergents and cleaners preferably comprise
0.5 to 98% by weight of sparingly soluble alkali metal silicate
0.5 to 80% by weight of cobuilders
ad 100% by weight of further customary ingredients.

The detergents and cleaners preferably comprise
0.5 to 98% by weight of sparingly soluble alkali metal silicate
0.5 to 80% by weight of cobuilders
0.5 to 80% by weight of pH regulators
ad 100% by weight of further customary ingredients.

The detergents and cleaners preferably comprise
0.5 to 98% by weight of sparingly soluble alkali metal silicate
0.5 to 80% by weight of cobuilders
0.5 to 80% by weight of pH regulators
1 to 50% by weight of surface-active substances
ad 100% by weight of further customary ingredients.

The detergents and cleaners preferably comprise
0.5 to 98% by weight of sparingly soluble alkali metal silicate
0.5 to 80% by weight of cobuilders
0.5 to 80% by weight of pH regulators
1 to 50% by weight of surface-active substances
1 to 70% by weight of a bleaching system
ad 100% by weight of further customary ingredients.

The detergents and cleaners preferably comprise
0.5 to 98% by weight of sparingly soluble alkali metal silicate 0.5 to 80% by weight of cobuilders
0.5 to 80% by weight of pH regulators
1 to 70% by weight of a bleaching system
ad 100% by weight of further customary ingredients.
The detergents and cleaners preferably comprise
0.5 to 98% by weight of sparingly soluble alkali metal silicate
0.5 to 80% by weight of pH regulators
1 to 50% by weight of surface-active substances
1 to 70% by weight of a bleaching system
ad 100% by weight of further customary ingredients.
The detergents and cleaners preferably comprise
0.5 to 98% by weight of sparingly soluble alkali metal silicate
0.5 to 80% by weight of pH regulators
1 to 70% by weight of a bleaching system
ad 100% by weight of further customary ingredients.
The detergents and cleaners preferably comprise
0.5 to 98% by weight of sparingly soluble alkali metal silicate
0.5 to 80% by weight of pH regulators
1 to 40% by weight of surface-active substances
ad 100% by weight of further customary ingredients.
The detergents and cleaners preferably comprise
0.5 to 98% by weight of sparingly soluble alkali metal silicate
0.5 to 80% by weight of pH regulators
ad 100% by weight of further customary ingredients.
The detergents and cleaners preferably comprise
0.5 to 98% by weight of sparingly soluble alkali metal silicate
1 to 70% by weight of a bleaching system
ad 100% by weight of further customary ingredients.

The preferred range in the abovementioned detergents and cleaners for the sparingly soluble alkali metal silicate is between 1 and 50% by weight and particularly preferably between 3 and 30% by weight. According to other embodiments of the invention, contents of from 60 to 98% by weight and particularly from 70 to 98% by weight are preferred.

Further preferred/particularly preferred ranges in the abovementioned detergents and cleaners are, for the cobuilders, 1 to 50% by weight and 1 to 30% by weight; for the pH regulators, likewise 1 to 50% by weight and 1 to 30% by weight, for the surface-active substances 1 to 30% by weight and 1 to 20% by weight and for the bleaching system 1 to 40% by weight and 1 to 20% by weight.

The cobuilders are preferably crystalline aluminosilicates, mono-, oligo- or polymeric carboxylic acids, alkali metal carbonates, alkali metal ortho-, pyro-, polyphosphates, crystalline alkali metal silicates having a crystal lattice without a sheet structure and/or amorphous alkali metal silicates.

The bleaching system is preferably an active chlorine and/or active oxygen carrier, bleach activator, bleach catalyst, enzymes used to remove diskolorations, perborate and/or percarbonate.

The surface-active substances are preferably anionic, cationic, nonionic and/or zwitterionic surfactants.

The pH regulators are preferably soda, citric acid, sodium citrate and/or bicarbonate.

For the preparation of water glass, which according to the process of the invention can be used as sodium silicate-containing starting material, sand is reacted with sodium hydroxide solution or soda or other alkalis.

The reaction with sand can be carried out hydrothermally, i.e. in aqueous solution at elevated pressure and temperature or thermally (tank furnace) by melting or heat-treating the reactants with one another.

Using suitable measures, such as, for example, the addition of alkalis or silicates, a molar ratio of $SiO_2$ to $Na_2O$ of $1.9 \leq e \leq 4$ is set in the abovementioned water glass, and then the starting material obtained in this way is treated with heat. The starting material can also be modified prior to heat treatment:

One embodiment involves converting the solution produced in the hydrothermal process to the solid form and/or changing the water content of the solid form. The water content can be increased by spraying with water (e.g. in a Lödige, Telschig or Schugi mixer), or lowered by afterdrying (e.g. belt, fluidized-bed, flotation dryer).

A further embodiment involves converting the solid produced during the thermal process to the liquid form and/or optimally adjusting the water content in the liquid solution by evaporation or dilution.

In particular, the redrying of the solution to give a spray-dried alkali metal silicate is preferred.

A further embodiment involves admixing the solid produced during the thermal process with water and subjecting it to heat treatment.

For producing the phyllosilicate in a particularly finely divided distribution in a phyllosilicatic silicate environment, the heat treatment is decisive. For optimum production of the silicate according to the invention, material temperatures of from 700 K to 1300 K are suitable. Preference is given to temperatures of from 800 K to 1200 K. Particular preference is given to temperatures of from 900 K to 1100 K. Here, the temperature can be distributed evenly within the furnace. Preferred apparatuses which are used are rotary tubes, fluidized bed furnaces, ingot molding furnaces, belt furnaces, entrained-dust furnaces, muffle furnaces. The heat can be introduced into the material directly, indirectly, by convection, radiation heating or contact heating.

The further constituents can be added at any desired stage before or after crystallization. It is preferred to add the further constituents to the reaction with the sand. It is particularly preferred to meter the further constituents into the solution from the reaction with the sand. It is likewise preferred to meter in the further constituents in the course of the atomization of the solution during the spray drying to just such a solution.

Following heat treatment, the product can preferably be changed physically. The particle size is optimally adjusted by grinding and subsequent classification. Suitable for the grinding are, for example, vibratory mills, ball mills, roller mills and pendulum roller mills from Neuman & Esser, and airjet mills, such as the models from Hosokawa-Alpine. Sifting and/or screening are used for the classification. For the screening, Aligaier, Rhewum and Locker screens, for example, can be used.

Preference is given to optimally adjusting the particle size by granulation and subsequent classification. For this, the ground powder is admixed with a granulation auxiliary on a pelletizing disk or a mixer. By applying shear forces the material agglomerates. One embodiment involves subsequently drying the material. A further embodiment involves leaving the material undried.

Granulation auxiliaries may be: bentonites, hectorites, saponites, modified or unmodified celluloses, polymers and copolymers, water glass, surfactants and other detergent ingredients.

The particle size is preferably optimally adjusted by roll compaction, grinding and subsequent classification. For this, the ground powder is optionally mixed with an auxiliary and compacted in a roll compactor (Hosokawa-Bepex, Alexanderwerk). The compaction pressure is between 2 and 100 kN/cm² roller width. Where appropriate, the material can be subsequently dried.

Compaction auxiliaries may be: bentonites, hectorites, saponites, modified or unmodified celluloses, polymers and copolymers, water glass, surfactants and other detergent ingredients.

The particularly fine distribution can be achieved according to the invention by adjusting the $M'_2O/SiO_2$ ratio of the material in the starting material, and then crystallizing the alkali metal phyllosilicates, preference being given here to sodium phyllosilicates.

The further constituents are preferably not in the phyllosilicatic fraction, but in the nonsilicatic fraction.

However, according to the invention, as a result of faults in the crystal structure, the phyllosilicatic fractions can also have considerable amounts of other constituents.

The sparingly soluble alkali metal silicates according to the invention can, as stated above, be used in detergents and cleaners. Preference is given here to pulverulent heavy-duty, color and specialty detergents. Heavy-use detergents are balanced formulations with the aim of as high a detergency as possible. Color detergents are intended primarily to protect colored textiles with regard to bleaching and fading of the colors and felting of the fibers. Specialty detergents are aimed at narrow areas of application, such as stain-removal salts, bleach boosters, curtain detergents, wool detergents etc.

Builder silicates can also be used in water softeners, which, primarily in regions of high water hardness, have a performance-enhancing effect on the wash result and a protective effect with regard to the washing machine.

Further applications are machine dishwashing detergents. Silicates are required here primarily because of their good soil dispersion, their high alkalinity and because of their protective action against damage to glassware. Glass damage here means the formation of layered deposits on glassware or the erosion of the glass surface. Both lead to the known undesired hazing of glassware.

Detergents and cleaners in their form as detergents, water softeners and machine dishwashing detergents can be used in powder form, granulate form and tablet form. For the tablet form, the detergent formulation is mixed and compressed to the appropriate shape using a tableting press. The shape can be cylindrical or cuboid or optionally also assume largely any desired other geometric shapes. In the case of the cylinder shape, the radius to height ratio can be between 0.25 and 4.

The compaction pressure can be between 12 and 0.3 kN/cm². This is essentially independent of the geometric shape of the tablet. Preference is also given to multistage compression. For this, any desired components of the formulation are compressed consecutively on one another in a plurality of stages, resulting in a plurality of layers. In the case of a two-layer tablet, a volume ratio of the two layers of from 1:10 to 10:1 is particularly preferred.

Determination of the particle size distribution using a Microtrac granulometer The size of particles in aqueous dispersion is determined using an ASVR/FRA Microtrac granulometer from Leeds & Northrup. The parameter measured is the reflection or diffraction of a laser beam upon passing through the dispersion. 400 ml of ethanol are pumped through the laser measurement cell. The solid sample (e.g. 70 mg) is metered in automatically, and the particle size distribution is determined after 10 min. The evaluation unit of the instrument calculates the mean particle diameter ($d_{50}$ value).

Determination of the particle size distribution by screen analysis The inserts having the desired screens are inserted into a Retsch screening machine. Here, the mesh width of the screens decreases from top to bottom. 50 g of the sample material to be investigated are placed on the widest screen. As a result of the vibratory movement of the screening machine, the sample material is conveyed through the various screens. The residues on the screens are weighed and calculated on the basis of the initial weight of material. The $d_{50}$ value can be calculated from the results.

Solubility test

For this, 800 ml of mains water (water hardness 18 degrees German hardness) are heated to 20° C. and stirred with a propeller (straight-arm) stirrer. 2 g of the test substance are added, and the mixture is stirred for 20 min. Using the slight vacuum from a water-jet pump, the dispersion is sucked through a 20 μm metal gauze. The screen is dried at 80 to 100° C. for one hour in a convection drying oven. The weight increase is based on the initial weight, standardized to percentage and the difference to 100% is referred to as solubility (in %).

Determination of the Calcium-binding Capacity (CBC):

A mixture of a buffer stock solution and deionized water is introduced into a ErWeKa dissolution tester, stirred and heat-treated at 30° C. The buffer stock solution is an aqueous solution of glycine, sodium chloride, calcium chloride and sodium hydroxide in suitable concentrations. The calcium-sensitive electrode Model 932001 from Orion is dipped into the solution and calibrated by replenishing the solution with a calcium stock solution. This is carried out using the EA 940 evaluation unit from Orion. After replenishing, the solution has a water hardness of 17 degrees German water hardness.

At the same time as the addition of the substance under investigation (1 g), the Orion EA 940 is started. The pH of the measurement solution is 10.2. The Orion EA 940 gives the concentration of free calcium ions at specific time intervals. Using the previously determined initial weight of calcium, the concentration of free, unbonded calcium ions after 10 min is used to deduce the amount of bonded calcium, i.e. the calcium-binding capacity. This is given in mg of $CaCO_3/g$.

Determination of the $SiO_2:Na_2O$ Ratio

A sample of 1.3 g of the material under investigation is added to about 100 ml of demineralized water and completely dissolved by stirring for 30 minutes at 50° C. The amount of $SiO_2$ and $Na_2O$ is then determined in each case by titration, and the $SiO_2:Na_2O$ ratio is calculated by calculating their molar amounts and relating them to one another.

a) Amount of Sodium Oxide:

This is determined by titrating the abovementioned aqueous solution of the sample potentiometrically with 1 N hydrochloric acid at room temperature in a Sensolab-Titrator from Jensen Systems.

b) The solution from a) is admixed with 85 ml of an approximately 4% strength aqueous solution of sodium fluoride and in turn titrated potentiometrically with 1 N hydrochloric acid at room temperature using the same apparatus as under a). 4 mol of sodium hydroxide are released per mole of $SiO_2$ and at the same time 4 mol of hydrochloric acid are consumed. These detection reactions are based on the following reaction equations.

$$H_2SiO_3 + 6NaF + H_2O \rightarrow Na_2SiF_6 + 4\ NaOH$$

$$4NaOH + HCl \rightarrow 4\ H_2O + 4NaCl$$

Determination of the Phase Composition

A sample of the material under investigation is pulverized in a mortar and measured in a Philips PW1710 X-ray powder diffractometer (Parameter: Cu K alpha 2 radiation, wavelength 1.54439 Angström, accelerating potential 35kV, heating current 28 mA, monochromator, scanning rate 3 degrees 2 theta per minute). The resulting intensities are evaluated as follows.

Substance Characteristic peak Source (d value in Angström) Alpha phase 3.29+/−0.07, typically SKS-5 (EP 0 164 552)

3.31 hkl 140 of JCPDS No. 22-1397

(but also 19–1233, 19–1234, 19–1237)

Beta phase 2.97+/−0.06 SKS-7 (EP 0 164 552)

hkl 400 of JCPDS No. 29–1261

(but also 19–1236, 23–0529)

Delta phase 3.97+/−0.08 SKS-6 (EP 0 164 552)

hkl 120 of JCPDS No. 22-1396

The JCPDS numbers refer to the reference diffractograms of substances listed by the Joint Committee of Powder Diffraction Standards.

The contents of the alpha, beta, delta phases of the silicates are calculated in percent from the intensities $I_a$, $I_b$, $I_d$—measured in pulses—of the alpha, beta, delta phases in accordance with the following formulae:

$$\text{Alpha content: } A[\%] = 100 * I_a/(I_a + I_b + I_d)$$

$$\text{Beta content: } B[\%] = 1.4 * 100 * I_b/(I_a + I_d)$$

$$\text{Delta content: } D[\%] = 100 - A - D$$

To determine the content of non-phyllosilicatic sodium silicate [AM], the background (pulse) of the X-ray peak is determined at a d value of 2.65 Angström ($I_{am}$) and converted to the percentage content using the following empirical formula.

$$AM[\%] = (I_{am} - 70) * 100/450$$

Compaction of Sodium Silicates

In a roll compactor (Hosokawa-Bepex, model: L200/50P), the material to be compacted is conveyed between the compactor rollers using a stuffing screw (setting: stage 5). This is done at such a rate that a nip length of 50 mm produces a compaction pressure of from 140 to 160 kN. The roller rotation is set at stage 3 to 7, and the roller gap is 0.1 mm. The resulting sticks (length: about 50 mm, thickness: about 2 to 5 mm, width about 10 to 15 mm) are crushed in a hammer mill (Alpine, model UPZ) having a perforation diameter of 5 mm at a rotary speed of from 600 to 1400 rpm. From the crushed pulverulent product are removed oversize particles (using a screen with a perforation diameter of 1.4 mm) and undersize particles (perforation diameter 0.25 mm).

Preparation of the Test Detergents:

The optical brighteners are stirred into a quarter of the amount of alkyl ethoxylate (AE) and mixed in a domestic multimixer (Braun) with half of the amount of soda. In a Lödige plowshare mixer, the remaining soda and all of the zeolite and polymer are mixed at 300 rpm for 15 minutes. Then, half of the remaining nonionic is sprayed on over the course of 5 minutes. The sparingly soluble alkali metal silicate according to the invention is then added and mixed for 10 minutes. The remaining second half of the AE is then sprayed on over the course of a further 5 minutes. Finally, LAS, soap, antifoam, phosphonate and compounds with optical brightener are added and subsequently mixed at 300 rpm for 10 minutes. In a tumble mixer, the mixture from the Lödige mixer is admixed, with low shear stress, with perborate, TAED and enzymes, and mixed for 15 minutes.

Washing Experiments:

In a standard domestic washing machine (model: Novotronic 927 WPS, Miele) specific test fabrics were washed at 60° C. and a water hardness of 18° German hardness with a test detergent at a dosing of 65 or 135 g/wash cycle. The test fabrics were supplemented with further laundry ballast (3.75 kg).

Determination of the Inorganic Incrustation:

To determine the inorganic incrustation, test fabrics, which are a cotton terry fabric (Vossen), in each case a cotton double-rib fabric, polyester/cotton blend (type 20A) and standard cotton fabric (type 10A) from Waschereiforschung Krefeld Testgewebe GmbH and a standard cotton fabric from the Swiss Materials Testing Institute, St. Gallen, Switzerland were repeatedly washed (15 times) in accordance with the above procedure. After 15 washes, a sample was taken from each of the fabrics and ashed in a muffle furnace at a temperature of 1000° C. for a period of 24 hours. The weights of the residues are calculated based on the amounts of fabric (weights) used.

Determination of the Detergency (D):

In each case 2 swatches of 5 different artificially soiled fabrics (WFK 10C, WFK 10D, WFK 20D, WFK 30D from Waschereiforschung Krefeld Testgewebe GmbH and EMPA 104 from the Swiss Materials Testing Institute, St. Gallen, Switzerland) were added to five different wash cycles and washed. The cloths were ironed, and the reflectances were determined four times using an Elrepho 3000 whiteness measuring instrument from Datacolor on each of the test swatches without UV excitation (using a UV blocking filter). The reflectance differences are calculated by subtracting the reflectances after washing from the reflectances before washing (delta R=R(after washing) [%] —R (before washing) [%]). The reflectances of the swatches before washing were determined prior to the experiment series using the same whiteness measuring instrument. A mean value for the reflectance differences of the swatches is calculated.

EXAMPLES

Example 1

(Comparison) 1600 kg of water glass with an $SiO_2/Na_2O$ ratio of 2.06 and an active substance content of 45.5% were admixed with 36.8 kg of sodium hydroxide solution (48% strength) and spray-dried in a spray tower from Kestner to give an amorphous sodium silicate having an active substance content of 83%. 15 kg of the amorphous sodium silicate are heat-treated at 720° C. for 90 min in a muffle furnace (Nabertherm, model W1000/H). A second batch is treated identically. The chilled materials (about 24 kg) are pulverized using a jaw crusher and a disk mill.

Example 2

(Comparison)

About 6 kg of this material are compacted in accordance with the general procedure for the compaction of sodium silicates. 2.1 kg of acceptable material, 2.7 kg of oversize material and 1.2 kg of undersize material are obtained.

Example 3

(Comparison)

7 kg of SKS-6 powder are ground for 15 min using a U 280A0 ball mill from Welte which is lined on the inside with metal and whose drum rotates at about 50 rpm. The grinding media used are 44 kg of porcelain balls.

Example 4

50 kg of water glass having an $SiO_2/Na_2O$ ratio of 2.06 and an active substance content of 45.5% were admixed with 0.612 kg of sodium hydroxide solution (48% strength) and spray-dried in a laboratory spray dryer (spray tower) from Anhydro to give an amorphous sodium silicate with an active substance content of 84%. 15 kg of the amorphous sodium silicate are heat-treated at 720° C. for 90 min in a muffle furnace (Nabertherm, model W1000/H). The chilled material (about 10 kg) is pulverized using a jaw crusher and a disk mill.

Example 5

50 kg of water glass having an $SiO_2/Na_2O$ ratio of 2.06 and an active substance content of 45.5% were admixed with 0.404 kg of sodium hydroxide solution (48% strength) and spray-dried in a laboratory spray dryer (spray tower) from Anhydro to give an amorphous sodium silicate with an active substance content of 84%. 15 kg of the amorphous sodium silicate are heat-treated at 720° C. for 90 min in a muffle furnace (Nabertherm, model W1000/H). The chilled material (about 10 kg) is pulverized using a jaw crusher and a disk mill.

Example 6

50 kg of water glass having an $SiO_2/Na_2O$ ratio of 2.06 and an active substance content of 45.5% were admixed with 0.2 kg of sodium hydroxide solution (48% strength) and spray-dried in a laboratory spray dryer (spray tower) from Anhydro to give an amorphous sodium silicate with an active substance content of 84%. 15 kg of the amorphous sodium silicate are heat-treated at 720° C. for 90 min in a muffle furnace (Nabertherm, model W1000/H). The chilled material (about 10 kg) is pulverized using a jaw crusher and a disk mill.

Example 7

1500 kg of water glass having an $SiO_2/Na_2O$ ratio of 2.06 and an active substance content of 45.5% were spray-dried in a spray tower from Kestner to give an amorphous sodium silicate having an active substance content of 84%. 15 kg of the amorphous sodium silicate are heat-treated at 720° C. for 90 min in a muffle furnace (Nabertherm, model W1000/H). This is then repeated once. The chilled materials (about 22 kg) are pulverized using a jaw crusher and a disk mill.

Example 8

Approximately 6 kg of this material are compacted in accordance with the general procedure for the compaction of sodium silicates. 2.4 kg of acceptable material, 2.4 kg of oversize material and 1.2 kg of undersize material are obtained.

Example 9

7 kg of SKS-6 powder are ground for 15 min using a U 280A0 ball mill from Welte which is lined on the inside with metal and whose drum rotates at about 50 rpm. The grinding media used are 44 kg of porcelain balls.

Example 10

50 kg of water glass having an $SiO_2/Na_2O$ of 3.45 and an active substance content of 36.1 % (grade Na 4/1 from Clariant France S.A.) were admixed with 6.51 kg of sodium hydroxide solution (48% strength) and spray-dried in a laboratory spray dryer (spray tower) from Anhydro to give an amorphous sodium silicate having an active substance content of 83%. 15 kg of the amorphous sodium silicate are heat-treated at 720° C. for 90 min in a muffle furnace (Nabertherm, model W1000/H). The chilled material (about 10 kg) is pulverized using a jaw crusher and a disk mill.

Example 11

50 kg of water glass having an $SiO_2/Na_2O$ of 3.45 and an active substance content of 36.1% (grade Na 4/1 from Clariant France S.A.) were admixed with 5.66 kg of sodium hydroxide solution (48% strength) and spray-dried in a laboratory spray dryer (spray tower) from Anhydro to give an amorphous sodium silicate having an active substance content of 84%. 15 kg of the amorphous sodium silicate are heat-treated at 720° C. for 90 min in a muffle furnace (Nabertherm, model W1000/H). The chilled material (about 10 kg) is pulverized using a jaw crusher and a disk mill.

Example 12
(Comparison)

A test ultracompact heavy-duty detergent comprising 30.0% of commercially available zeolite was prepared in accordance with the general procedure "Preparation of the test detergents". The procedure was adapted inasmuch as the optical brighteners are stirred in a quarter of the alkyl ethoxylate (AE) and mixed with a third of the amount of soda. The remaining soda, the polymer and all of the zeolite are mixed in the Lödige mixer, and the remaining AE is sprayed on. Then, all of the other components with the exception of enzymes, TAED and perborate are mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 3.30%, detergency 15.9%.

Example 13
(Comparison)

A test ultracompact heavy-duty detergent comprising 10.0% of the silicate from Example 1 was prepared in accordance with the general procedure "Preparation of the test detergents". The procedure was adapted inasmuch as the remaining soda, the polymer and all of the zeolite are mixed in a Lödige mixer, then half of the remaining AE is sprayed on, then the silicate from Example 1 is mixed in and finally the remaining AE is sprayed on. All of the other components with the exception of enzymes, TAED and perborate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 2.54%, detergency 18.1%.

Example 14

A test ultracompact heavy-duty detergent comprising 10.0% of the silicate from Example 4 was prepared in accordance with the general procedure "Preparation of the test detergents". The procedure was adapted inasmuch as the remaining soda, the polymer and all of the zeolite are mixed in a Lödige mixer, then half of the remaining AE is sprayed on, then the silicate from Example 4 is mixed in and finally the remaining AE is sprayed on. All of the other components with the exception of enzymes, TAED and perborate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 2.41%, detergency 17.7%.

Example 15

A test ultracompact heavy-duty detergent comprising 10.0% of the silicate from Example 7 was prepared in accordance with the general procedure "Preparation of the test detergents". The procedure was adapted inasmuch as the remaining soda, the polymer and all of the zeolite are mixed in a Lbdige mixer, then half of the remaining AE is sprayed on, then the silicate from Example 7 is mixed in and finally the remaining AE is sprayed on. All of the other components with the exception of enzymes, TAED and perborate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 1.97%, detergency 18.2%.

Example 16

A test ultracompact heavy-duty detergent comprising 10.0% of the silicate from Example 8 was prepared in accordance with the general procedure "Preparation of the test detergents". The procedure was adapted inasmuch as the remaining soda, the polymer and all of the zeolite are mixed in a Lödige mixer, then half of the remaining AE is sprayed on, then the silicate from Example 8 is mixed in and finally the remaining AE is sprayed on. All of the other components with the exception of enzymes, TAED and perborate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 1.63%, detergency 18.5%.

Example 17

A test ultracompact heavy-duty detergent comprising 10.0% of the silicate from Example 9 was prepared in accordance with the general procedure "Preparation of the test detergents". The procedure was adapted inasmuch as the remaining soda, the polymer and all of the zeolite are mixed in a Lödige mixer, then half of the remaining AE is sprayed on, then the silicate from Example 9 is mixed in and finally the remaining AE is sprayed on. All of the other components with the exception of enzymes, TAED and perborate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 1.77%, detergency 18.9%.

Example 18

A test ultracompact heavy-duty detergent comprising 30.0% of the silicate from Example 9 was prepared in accordance with the general procedure "Preparation of the test detergents". The procedure was adapted inasmuch as the optical brighteners are stirred in a quarter of the alkyl ethoxylate (AE) and mixed with a third of the amount of sulfate. The remaining sulfate and the total amount of the silicate from Example 9 are mixed in a Lödige mixer, and the remaining AE is sprayed on. All of the other components apart from enzymes, TAED and percarbonate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 2.40%, detergency 21.0%.

Example 19

A test ultracompact heavy-duty detergent comprising 47% of the silicate from Example 4 was prepared in accordance with the general procedure "Preparation of the test detergents". The procedure was adapted inasmuch as the optical brighteners are stirred in a quarter of the alkyl ethoxylate (AE) and mixed with two thirds of the amount of bicarbonate. The remaining bicarbonate and the total amount of the silicate from Example 4 are mixed in a Lödige mixer, and the remaining AE is sprayed on. All of the other components apart from enzymes, TAED and percarbonate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 2.13%, detergency 23.2%.

Example 20

A test standard heavy-duty detergent comprising 10% of the silicate from Example 7 was prepared in accordance with the general procedure "Preparation of the test detergents". The procedure was adapted inasmuch as the optical brighteners are stirred into the total amount of the alkyl ethoxylate (AE) and mixed with a third of the amount of sulfate. The remaining sulfate, the phosphate, and the total amount of the silicate from Example 7 are mixed in a Lödige mixer. All of the other components apart from enzymes and percarbonate are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 2.10%, detergency 17.5%.

Example 21

A test standard heavy-duty detergent comprising 4% of the silicate from Example 8 was prepared in accordance with the general procedure "Preparation of the test detergents". The procedure was adapted inasmuch as the optical brighteners are stirred into half of the alkyl ethoxylate (AE) and mixed with two thirds of the amount of sulfate. The remaining sulfate, the soda, the polymer, all of the zeolite and the silicate from Example 8 are mixed in a Lödige mixer, then the remaining AE is sprayed on. All of the other components apart from enzymes, TAED and perborate are then mixed in.

The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 2.34%, detergency 16.9%.

Example 22

A test standard heavy-duty detergent comprising 10% of the silicate from Example 9 was prepared in accordance with the general procedure "Preparation of the test detergents". The procedure was adapted inasmuch as all of the zeolite, the polymer and the bicarbonate are mixed in a Lödige mixer, then the first half of the AE is sprayed on, and then the silicate from Example 9 and the sulfate are mixed in, and finally the remaining AE is sprayed on. All of the other components apart from the enzymes are then mixed in. The latter are then mixed into the mixture prepared in the Lödige mixer in a tumble mixer. The formation of inorganic incrustations and the detergency were investigated in model washing experiments in accordance with the general procedures "Washing experiments", "Determination of the inorganic incrustation" and "Determination of the detergency": inorganic incrustation 1.80%, detergency 17.6%.

Example 23

A test water softener comprising 15% of the silicate from Example 8 was prepared in accordance with the general procedure "Preparation of the test detergents". The procedure was adapted inasmuch as all of the zeolite, the polymer, the bicarbonate, the citric acid, the sulfate and the silicate from Example 8 are mixed in a Lödige mixer, and then the AE is sprayed on. The remaining components are then mixed in. The formation of inorganic incrustations and the detergency were investigated in model washing experiments using a combination of commercially available ultracompact detergent (dosing 55 g, moderate soiling, very low water hardness) and test water softener (dosing 30 g) in accordance with the general procedures "Washing experiments", "Determination of the inorganic incrustation" and "Determination of the detergency": inorganic incrustation 1.64%, detergency 16.4%.

Example 24

A test ultracompact heavy-duty detergent comprising 15% of the silicate from Example 9 was prepared in accordance with the general procedure "Preparation of the test detergents". The procedure was adapted inasmuch as the remaining soda, the polymer and all of the zeolite are mixed in a Lödige mixer, then half of the remaining AE is sprayed on, then the silicate from Example 9 is mixed in and finally the remaining AE is sprayed on. All of the other components apart from enzymes, TAED and perborate are then mixed in. The latter are then mixed into the mixture prepared in the Lödige mixer in a tumble mixer. Using a hydraulic two-column press from Matra, Frankfurt (model 200kN/4625.00000.191), detergent tablets were pressed (pressure 6 kN, tablet diameter 45 mm, tablet height 18 mm, weight 40 g). The formation of inorganic incrustations and the detergency were then investigated in model washing experiments in accordance with the general procedures "Washing experiments", "Determination of the inorganic incrustation" and "Determination of the detergency" (dosing per wash cycle: 2 x 40 g): inorganic incrustation 2.4%, detergency 18.8%.

Example 25

Detergent tablets were pressed and tested as in Example 24: inorganic incrustation 2.19%, detergency 1 8.1%.

Examples 26 to 29

Machine dishwashing detergents were prepared in accordance with the general procedure "Preparation of the machine dishwashing detergents".

Example 30

A machine dishwashing detergent gel is prepared by mixing water glass, phosphate, soda, sodium hydroxide, phosphonate, polymer, alkanesulfonate, phosphoric ester using a dispergator (Ultraturrax, Hanke und Kunkel). Finally, silicate and sodium hypochlorite are briefly mixed in. Substances used:

| | |
|---|---|
| Zeolite A: | Wessalith P, Degussa |
| Phosphate 1: | Sodium tripolyphosphate, e.g. from Thermphos Intl. |
| Phosphate 2: | Makrophos 1018, BK Giulini |
| Phosphate 3: | Thermphos NW coarse |
| Polymer: | Sokalan CP5, BASF |
| Soda: | Heavy soda, Matthes & Weber |
| Bicarbonate: | Solvay |
| Percarbonate: | Oxyper C, Solvay Interox |
| Perborate monohydrate (Perborate mh): | Degussa |
| Perborate tetrahydrate (Perborate th): | Degussa |
| TAED 1: | TAED 4049, Clariant |
| TAED 2: | TAED 3873, Clariant |
| LAS: | Marlon ARL, Hüls |
| AE 1: | Genapol OAA 080, Clariant |
| AE 2: | Genapol 2822, Clariant |
| Soap: | Liga basic soap HM11E |
| Antifoam: | 11.Pwd.ASP3, Wacker |
| Enzyme 1: | Termamyl 60T, Solvay Enzymes |
| Enzyme 2: | Savinase 6.0 TW, Solvay Enzymes |
| Optical brightener 1: | Tinopal CBS-X, Ciba |
| Optical brightener 2: | Tinopal DMS-X, Ciba |
| Phosphonate 1: | Dequest 2041, Monsanto |
| Phosphonate 2: | Dequest 200, Monsanto |
| Citric acid: | Jungbunzlauer |
| Polyvinylpyrrolidone: | Sokalan HP50, BASF |
| Soil release polymer: | SRC 1, Clariant |
| CMC: | Tylose 2000, Clariant |
| Cellulose: | Arbocell, Rettenmaier |
| Sulfate: | Solvay |
| Sodium acetate trihydrate: | Riedel de Haen |
| Perfume: | Lemon perfume 78122D, Orissa |
| Sodium hydroxide: | Microprills 100%, Riedel de Haen |
| Alkanesulfonate: | Hostapur SAS 60, Clariant |
| Water glass: | 45.5% of active substance, modulus 2.0, Clariant France |
| Phosphoric ester: | Hordaphos 158, Clariant |
| Sodium hypochlorite: | Celanese GmbH |

TABLE 1

| | | \multicolumn{11}{c}{Example} |
|---|---|---|---|---|---|---|---|---|---|---|---|---|
| | | 1 | 2 | 3 | 4 | 5 | 6 | 7 | 8 | 9 | 10 | 11 |
| A* | [%] | 12.5 | — | — | 11.3 | 12.5 | 14.0 | 13.3 | — | — | 9.2 | 11.2 |
| B* | [%] | 9.1 | — | — | 8.5 | 5.8 | 2.8 | 8.3 | — | — | 6.8 | 5.2 |
| D* | [%] | 71.7 | — | — | 74.4 | 77.9 | 76.6 | 70.2 | — | — | 74.0 | 71.0 |
| AM* | [%] | 6.7 | — | — | 5.8 | 3.8 | 6.6 | 8.2 | — | — | 10.0 | 12.7 |
| y/x | | 1.40 | — | — | 1.98 | 2.56 | 2.70 | 2.96 | — | — | 5.87 | 8.67 |
| e/a | | 1.95 | — | — | 2.00 | 2.02 | 2.04 | 2.06 | — | — | 2.18 | 2.29 |
| >1180 μm frac. | [%] | — | 2.40 | — | — | — | — | — | — | 1.90 | — | — |
| >1000 μm frac. | [%] | 4.2 | 15.4 | — | 3.7 | 4.3 | 3.3 | 3.6 | 13 | — | 3.1 | 3.5 |
| >710 μm frac. | [%] | — | 49.5 | — | — | — | — | — | 45.3 | — | — | — |
| >500 μm frac. | [%] | 18.7 | — | — | 18.1 | 19.5 | 17.5 | 18.8 | — | — | 18.1 | 12.9 |
| >425 μm frac. | [%] | — | 82.2 | — | — | — | — | — | 77.8 | — | — | — |
| >300 μm frac. | [%] | 28.1 | — | — | 27.4 | 29 | 26.8 | 28 | — | — | 26.9 | 20.2 |
| >212 μm frac. | [%] | — | 97.2 | — | — | — | — | — | 95.7 | — | — | — |
| >150 μm frac. | [%] | 46.5 | 98.3 | — | 45.8 | 48.4 | 46.7 | 47.2 | 97 | — | 45.3 | 39.5 |
| >75 μm frac. | [%] | 85.4 | — | 19.3 | 83.9 | 74.7 | 74.5 | 76.7 | | 26.8 | 96.9 | 66.1 |
| >53 μm frac. | [%] | — | — | 32.4 | — | — | — | — | — | 39.4 | — | — |
| >33 μm frac. | [%] | — | — | 48.7 | — | — | — | — | — | 54.9 | — | — |
| >20 μm frac. | [%] | — | — | 65 | — | — | — | — | — | 70.7 | — | — |
| $d_{50}$ | [μm] | 143 | 705 | 32.6 | 141 | 146 | 141 | 143 | 669 | 39.2 | 136 | 120 |
| Solubility | [%] | 58.4 | 84 | 75 | 39.6 | 50.2 | 41.6 | 34 | 50 | 52 | 24.5 | 8.82 |
| CBV | [mg of CaCO$_3$/g] | 209 | 219 | 216 | 207 | 208 | 211 | 209 | 217 | 218 | 208 | 207 |

A*, B* and C* refer to the content of alpha-, beta- and delta-disodium disilicate respectively, AM* being the proportion of non-phyllosilicatic sodium silicates.

TABLE 2

| | | \multicolumn{14}{c}{Examples} |
|---|---|---|---|---|---|---|---|---|---|---|---|---|---|---|---|
| | | 12 | 13 | 14 | 15 | 16 | 17 | 18 | 19 | 20 | 21 | 22 | 23 | 24 | 25 |
| Zeolite A | [%] | 30 | 20 | 20 | 20 | 20 | 20 | — | — | — | 20 | 25 | 40 | 15 | 15 |
| Phosphate | [%] | — | — | — | — | — | — | — | — | 20 | — | — | — | — | — |
| Silicate from Ex. 1 | [%] | — | 10 | — | — | — | — | — | — | — | — | — | — | — | — |
| Silicate from Ex. 4 | [%] | — | — | 10 | — | — | — | — | 47 | — | — | — | — | — | — |
| Silicate from Ex. 7 | [%] | — | — | — | 10 | — | — | — | — | 10 | — | — | — | — | — |
| Silicate from Ex. 8 | [%] | — | — | — | — | 10 | — | — | — | — | 4 | — | 15 | — | — |
| Silicate from Ex. 9 | [%] | — | — | | | | 10 | 30 | — | — | — | 10 | — | 15 | 15 |
| Polymer | [%] | 5 | 5 | 5 | 5 | 5 | 5 | — | — | — | 3 | 7 | 7 | 5 | 4 |
| Soda | [%] | 17 | 17 | 17 | 17 | 17 | 17 | — | — | — | 20 | — | — | 17 | 13 |
| Bicarbonate | [%] | — | — | — | — | — | — | — | 15 | — | — | 18 | 15 | — | 6 |
| Perborate mh | [%] | 18 | 18 | 18 | 18 | 18 | 18 | — | — | — | — | — | — | 12 | — |
| Perborate th | [%] | — | — | — | — | — | — | — | — | 25 | 20 | — | — | — | — |
| Percarbonate | [%] | — | — | — | — | — | — | 18 | 18 | — | — | — | — | — | 12 |
| TAED | [%] | 5 | 5 | 5 | 5 | 5 | 5 | 5 | 5 | — | 2.5 | — | — | 5.0 | 5 |
| LAS | [%] | 10 | 10 | 10 | 10 | 10 | 10 | 10 | — | 6.7 | 10 | 8.0 | — | 10.0 | 7 |
| AE | [%] | 8 | 8 | 8 | 8 | 8 | 8 | 8 | 10 | 2.2 | 5 | 10 | 2 | 7 | 4 |
| Soap | [%] | 2 | 2 | 2 | 2 | 2 | 2 | 2 | — | — | — | 1 | 2 | — | — |
| Antifoam | [%] | 1 | 1 | 1 | 1 | 1 | 1 | 1 | 1 | 0.6 | 0.6 | 1 | — | 1.0 | — |
| Enzyme 1 | [%] | 1.5 | 1.5 | 1.5 | 1.5 | 1.5 | 1.5 | 1.5 | 1.5 | 0.6 | 0.6 | 1.5 | — | 1.0 | — |
| Enzyme 2 | [%] | 1.5 | 1.5 | 1.5 | 1.5 | 1.5 | 1.5 | 1.5 | 1.5 | 0.6 | 0.6 | 1.5 | — | 1.0 | — |
| Optical brightener 1 | [%] | 0.25 | 0.25 | 0.25 | 0.25 | 0.25 | 0.25 | 0.25 | 0.25 | 0.10 | 0.10 | — | — | 0.3 | — |
| Optical brightener 2 | [%] | 0.25 | 0.25 | 0.25 | 0.25 | 0.25 | 0.25 | 0.25 | 0.25 | 0.10 | 0.10 | — | — | 0.3 | — |
| Phosphonate | [%] | 0.5 | 0.5 | 0.5 | 0.5 | 0.5 | 0.5 | 0.5 | 0.5 | 0.2 | 0.2 | 0.5 | — | 0.5 | — |
| Citric acid | [%] | — | — | — | — | — | — | — | — | — | — | — | 2 | 5 | 5 | 5 |
| Polyvinyl-pyrrolidone | [%] | — | — | — | — | — | — | — | — | — | — | 1 | — | — | — |
| Soil release polymer | [%] | — | — | — | — | — | — | — | — | — | — | — | 0.8 | — | — |
| CMC | [%] | — | — | — | — | — | — | — | — | — | — | 1 | — | — | — |
| Cellulose | [%] | — | — | — | — | — | — | — | — | — | — | — | — | — | 6.2 |
| Sulfate | [%] | — | — | — | — | — | — | 22 | — | 33.9 | 13.3 | 11.7 | 14 | 5 | |
| Sodium acetate, solid | [%] | — | — | — | — | — | — | — | — | — | — | — | — | 5.0 | 8 |
| Dosing | [%] | 65 | 65 | 65 | 65 | 65 | 65 | 65 | 65 | 135 | 135 | 65 | 30 + 55 | 80 | 80 |
| Inorg. incrustation | [%] | 3.30 | 2.54 | 2.41 | 1.97 | 1.63 | 1.77 | 2.40 | 2.13 | 2.10 | 2.34 | 1.80 | 1.64 | 2.40 | 2.19 |
| Detergency | [%] | 15.9 | 18.1 | 17.7 | 18.2 | 18.5 | 18.9 | 21.0 | 23.2 | 17.5 | 16.9 | 17.6 | 16.4 | 18.8 | 18.1 |

TABLE 3

| | | \multicolumn{4}{c}{Examples} | | | |
|---|---|---|---|---|---|
| | | 26 | 27 | 28 | 29 |
| Phosphate 2 | [%] | | 25.0 | 40.0 | 47.0 |
| Silicate from Ex. 8 | [%] | 20.0 | 15.0 | 15.0 | 5.2 |
| Soda | [%] | 22.7 | 30.0 | 24.7 | 27.5 |
| Sodium citrate trihydrate | [%] | 30.0 | | | |
| Percarbonate | [%] | 10.0 | | | |
| Perborate monohydrate | [%] | | 10.0 | 10.0 | 10.0 |
| Polymer | [%] | 7.5 | 5.0 | 3.5 | 3.5 |
| TAED 2 | [%] | 5.0 | 2.0 | 2.0 | 2.0 |
| Enzyme 1 | [%] | 1.0 | 1.5 | 1.0 | 1.0 |
| Enzyme 2 | [%] | 2.0 | 2.5 | 2.0 | 2.0 |
| AE 2 | [%] | 1.5 | 1.5 | 1.5 | 1.5 |
| Perfume | [%] | 0.3 | 1.5 | 0.3 | 0.3 |
| Sulfate | [%] | | 6.0 | | |
| Dosing | [ml] | 25 | 25 | 25 | 25 |

TABLE 4

| | | Example 30 |
|---|---|---|
| Phosphate 3 | [%] | 22.0 |
| Silicate from Ex. 9 | [%] | 5.5 |
| Soda | [%] | 1.0 |
| Sodium hydroxide | [%] | 1.0 |
| Phosphonate 2 | [%] | 0.6 |
| Polymer | [%] | 1.5 |
| Alkanesulfonate | [%] | 1.5 |
| Water glass | [%] | 37.0 |
| Phosphoric ester | [%] | 0.4 |
| Sodium hypochlorite | [%] | 9.0 |
| Water | [%] | 20.5 |
| Dosing | [g] | 40 |

What is claimed is:

1. A sparingly soluble alkali metal silicate which comprises an alkali metal phyllosilicate and a non-phyllosilicatic alkali metal silicate, said sparingly soluble alkali metal silicate having an overall formula $$x\, M^I_2O \cdot y\, SiO_2,$$

in which $M^I$ is an alkali metal and y/x is (1.9 to 500):1 wherein said phyllosilicate comprises from 50 to 77 weight percent of a delta crystalline Phase and said non-phyllosilicatic alkali metal silicate comprises from 0.1 to 10 weight percent of said sparingly soluble alkali metal silicate, wherein said alkali metal phyliosilicate is embedded into a non-phyllosilicatic alkali metal silicate matrix.

2. The sparingly soluble alkali metal silicate as claimed in claim 1, wherein y/x is (2.0 to 200):1.

3. The sparingly soluble alkali metal silicate as claimed in claim 1, wherein $M^I$ is sodium.

4. The sparingly soluble alkali metal silicate as claimed in claim 1, wherein the non-phyllosilicatic alkali metal silicate environment comprises non-phyllosilicatic sodium silicates.

5. The sparingly soluble alkali metal silicate as claimed In claim 1, wherein the alkali metal phyllosilicate comprises sheet crystalline disodium disilicates.

6. The sparingly soluble alkali metal silicate as claimed in claim 1, wherein the alkali metal phyllosilicate comprises 50to 77% by weight of delta-disodium disilicate, finely divided and 0.1 to 9% by weight of non-phyllosillcatic sodium silicate.

7. The sparingly soluble alkali metal silicate as claimed in claim 1, which further comprises, based on the content of alkali metal silicate, up to 10% by weight of further constituents.

8. The sparingly soluble alkali metal silicate as claimed in claim 7, further comprising further constituents selected from the group consisting of cationic, constituents anionic constituents, and mixtures thereof.

9. The sparingly soluble alkali metal silicate as claimed in claim 8, wherein the cationic constituents are alkali metal ions, alkaline earth metal cations, cations selected from the group consisting of Fe, W, Mo, Ta, Pb, Sn, Al, Zn, Ti, V, Cr, Mn, Co, Ni, and mixtures thereof.

10. The sparingly soluble alkali metal silicate as claimed in claim 8, wherein the anionic constituents are selected from the group consisting of sulfates, fluorides, chlorides, bromides, iodides, carbonates, hydrogen carbonates, nitrates, oxide hydrates, phosphates, borates, and mixtures thereof.

11. The sparingly soluble alkali metal silicate as claimed in claim 1, further comprising up to 10 mol% of boron, based on the total content of $SiO_2$.

12. The sparingly soluble alkali metal silicate as claimed in claim 1, further comprising up to 50 mol% of phosphorus, based on the total content of $SiO_2$.

13. The sparingly soluble alkali metal silicate as claimed in claim 1, which has, as powder, a mean particle diameter of from 0.1 to 150 $\mu$m.

14. The sparingly soluble alkali metal silicate as claimed in claim 1, which has, as compacted granulate, a mean particle diameter of from 10 to 2000 $\mu$m.

15. A detergent and cleaner which comprises the sparingly soluble alkali metal silicate as claimed in claim 1.

16. The detergent and cleaner as claimed in claim 15, which comprises 0.5 to 98% by weight of said sparingly soluble alkali metal silicate, 0.5 to 80% by weight of cobuilders, and up to 100% by weight of further customary ingredients.

17. The detergent and cleaner as claimed in claim 15, which comprises 0.5 to 98% by weight of sparingly soluble alkali metal silicates, 0.5 to 80% by weight of cobuilders, 0.5 to 80% by weight of pH regulators, and up to a100% by weight of further customary ingredients.

18. The detergent and cleaner as claimed in claim 16, which comprises 0.5 to 98% by weight of sparingly soluble alkali metal silicate, 0.5 to 80% by weight of cobuilders 0.5 to 80% by weight of pH regulators, 1 to 50% by weight of surface-active substances, and up to 100% by weight of further customary ingredients.

19. The detergent and cleaner as claimed in claim 15, which comprises 0.5 to 98% by weight of sparingly soluble alkali metal silicates, 0.5 to 80% by weight of cobuilders, 0.5 to 80% by weight of pH regulators, 1 to 50% by weight of surface-active substances, 1 to 70% by weight of a bleaching system, and up to 100% by weight of further customary ingredients.

20. The detergent and cleaner as claimed in claim 15, which comprises 0.5 to 98% by weight of sparingly soluble alkali metal silicate, 0.5 to 80% by weight of cobuilders, 0.5 to 80% by weight of pH regulators, 1 to 70% by weight of a bleaching system, and up to 100% by weight of further customary ingredients.

21. The detergent and cleaner as claimed in claim 15, which comprises 0.5 to 98% by weight of sparingly soluble alkali metal silicate, 0.5 to 80% by weight of pH regulators, 1 to 50% by Weight of surface-active substances, 1 to 70% by weight of a bleaching system and up to 100% by weight of further customary ingredients.

22. The detergent and cleaner as claimed in claim 15, which comprises 0.5 to 98% by weight of sparingly soluble alkali metal silicate, 0.5 to 80% by weight of pH regulators, 1 to 70% by weight of a bleaching system, and up to a 100% by weight of further customary ingredients.

23. The detergent and cleaner as claimed in claim 15, which comprises 0.5 to 98% by weight of sparingly soluble alkali metal silicate, 0.5 to 80% by weight of pH regulators, 1 to 40% by weight of surface-active substances, and up to 100% by weight of further customary ingredients.

24. The detergent and cleaner as claimed in claim 15, which comprises 0.5 to 98% by weight of sparingly soluble alkali metal silicate, 0.5 to 80% by weight of pH regulators, and up to 100% by weight of further customary ingredients.

25. The detergent and cleaner as claimed in claim 15, which comprises 0.5 to 98% by weight of sparingly soluble alkali metal silicate, $_1$ to 70% by weight of a bleaching system, and up to 100% by weight of further customary ingredients.

26. The detergent and cleaner as claimed in claim 15, wherein said sparingly soluble alkali metal silicate comprises 1 to 50% by weight of the detergent and cleaner.

27. The detergent and cleaner as claimed in claim 15, wherein the content of sparingly soluble alkali metal silicate is 60 to 98% by weight of the detergent and cleaner.

28. The detergent and cleaner as claimed In claim 15, further comprising cobuilders selected from the group consisting of crystalline aluminosilicates, mono-carboxylic acids, oligo-carboxylic acids polymeric carboxylic acids, alkali metal carbonates, alkali metal ortho-, pyro- or polyphosphates, crystalline alkali metal silicates having a crystal lattice without a layered structure,c amorphous alkali metal silicates, and mixtures thereof.

29. The detergent and cleaner as claimed in claim 15, further comprising a bleaching system selected from the group consisting of an active chlorine carrier, active oxygen carrier, a bleach activator, a bleach catalyst, enzymes used to remove discolorations perborate, percarbonate, and mixtures thereof.

30. The detergent and cleaner as claimed in claim 15, further comprising surface-active substances selected from the group consisting of anionic, cationic, nonionic, zwitterionic surfactants, and mixtures thereof.

31. The detergent and cleaner as claimed In claim 15, further comprising pH regulators are selected from the group consisting of soda, citric acid, sodium citrate, bicarbonate, and mixtures thereof.

32. A sparingly soluble alkali metal silicate which comprises an alkali metal phyllosilicate and a non-phyllosilicatic alkali metal silicate, said sparingly soluble alkali metal silicate having an overall formula $$x\, M'_2O \cdot y\, SiO_2,$$

in which $M^I$ is an alkali metal and y/x is (1.9 to 500):1, wherein said phyllosilicate comprises from 70 to 77 percent by weight of delta disodium disilicate and the non-phyllosilicate comprises from 0.1 to 10 percent by weight of the sparingly soluble alkali metal silicate, wherein said alkali metal phyllosilicate is embedded into a non-phyllosilicatic alkali metal silicate matrix.

33. A detergent and cleaner comprising the sparingly soluble alkali metal silicate of claim 32.

* * * * *